United States Patent [19]
Mayo et al.

[11] Patent Number: 5,224,130
[45] Date of Patent: Jun. 29, 1993

[54] SIGNAL DETECTION APPARATUS

[75] Inventors: Richard H. Mayo, Paignton; Alan Tipper, South Brent, both of United Kingdom

[73] Assignee: Northern Telecom Limited, Montreal, Canada

[21] Appl. No.: 805,873

[22] Filed: Dec. 9, 1991

[30] Foreign Application Priority Data

Dec. 22, 1990 [GB] United Kingdom ............... 9027988

[51] Int. Cl.$^5$ ............................................. H03L 7/00
[52] U.S. Cl. .................................. 375/120; 307/528; 375/81
[58] Field of Search ................. 375/119, 120, 80, 81; 307/528; 328/133

[56] References Cited

U.S. PATENT DOCUMENTS

| | | | |
|---|---|---|---|
| 4,371,974 | 2/1983 | Dupan | 375/120 |
| 4,400,667 | 8/1983 | Belkin | 375/120 |
| 5,012,494 | 4/1991 | Lai et al. | 375/120 |
| 5,027,085 | 6/1991 | DeVito | 375/120 |

*Primary Examiner*—Curtis Kuntz
*Assistant Examiner*—T. Ghebretinsae
*Attorney, Agent, or Firm*—Lee, Mann, Smith, McWilliams, Sweeney & Ohlson

[57] ABSTRACT

A digital signal data retiming and clock extraction apparatus including a series of three data latches (111, 121, 131), connected in cascade, means for applying digital data signals to the first latch, means for clocking (701) the first and third latches in phase with the data signals input to the first latch, means for clocking the second latch in antiphase with the data signals input to the first latch, coincidence detection means (210) to which are applied the digital data signals (A) input to the first latch, the data signals output (B) of the second latch and the data signals output (C) of the third latch, the coincidence detection means being arranged to derive output data signals (X) in accordance with the algorithm X=B.(A−C), and a first phase lock loop feedback means (Q1, Q2, 301) whereby the output data signals (X) of the coincidence detection circuit control the timing of the clocking means to maintain the phase relationship with the digital data signals input to the first latch.

4 Claims, 5 Drawing Sheets

SIGNAL DETECTION APPARATUS

FIELD OF THE INVENTION

This invention relates to a signal data retiming and clock extraction apparatus, such as is used for retiming digital signals received from an optical transmission link.

Typically a digital data signal transmitted via an optical link may be a high bit rate non-return-to-zero (NRZ) signal. A requirement exists for generating at a receiver a local clock signal, phase locked to the incoming data, and retiming the data using the local clock to provide emitter coupled logic (ECL) compatible regenerated clock and data signals as outputs for subsequent equipments. The clock extraction process should provide for minimal jitter transfer function gain and minimal self generated jitter while also being tolerant of high levels of incoming data jitter and long strings of ones or zeros. An alarm indication of loss of clock synchronisation is also desirable (loss of data excepted).

DESCRIPTION OF RELATED ART

U.S. Pat. No. 4,535,459 (Hogge, Jr.) discloses a phase detection function obtained by performing two series timing operations on a data input signal in accordance with a local clock and exclusive-OR'ing the signals involved in the two retiming operations. The combinations of the two signals can then be used to provide an indication of phase of the clock with respect to the data. Utilising the phase detected signal a voltage controlled oscillator (VCO) can be employed to provide the clock input to the retiming means the circuit can provide not only data regeneration but also clock recovery from the data input. In the circuits disclosed the two data retiming operations are performed utilising two D-type flip-flops in series, the input and output of each flip-flop being the two inputs to a respective OR gate.

SUMMARY OF THE INVENTION

According to the present invention there is provided a digital signal data retiming and clock extraction apparatus including a series of three data latches, as hereinafter defined, connected in cascade, means for applying digital data signals to the first latch, means for clocking the first and third latches in phase with the data signals input to the first latch, means for clocking the second latch in 180° out of phase with the data signals input to the first latch, coincidence detection means to which are applied the digital data signals (A) input to the first latch, the data signals output (B) of the second latch and the data signals output (C) of the third latch, the coincidence detection means being arranged to derive output data signals (X) in accordance with the algorithm $X = BX(A-C)$, and a first phase lock loop feedback means whereby the output data signals (X) of the coincidence detection circuit control the timing of the clocking means to maintain the phase relationship with the digital data signals input to the first latch.

In a preferred embodiment of the invention the means for clocking the latches comprises a voltage controlled oscillator (VCO) and the first phase lock loop feedback means includes means for deriving from the output signals (X) of the coincidence detection circuit an error signal voltage which is applied to a control input of the VCO to control the frequency of the VCO to maintain the VCO output in phase with the digital data signals (A) input to the first latch.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
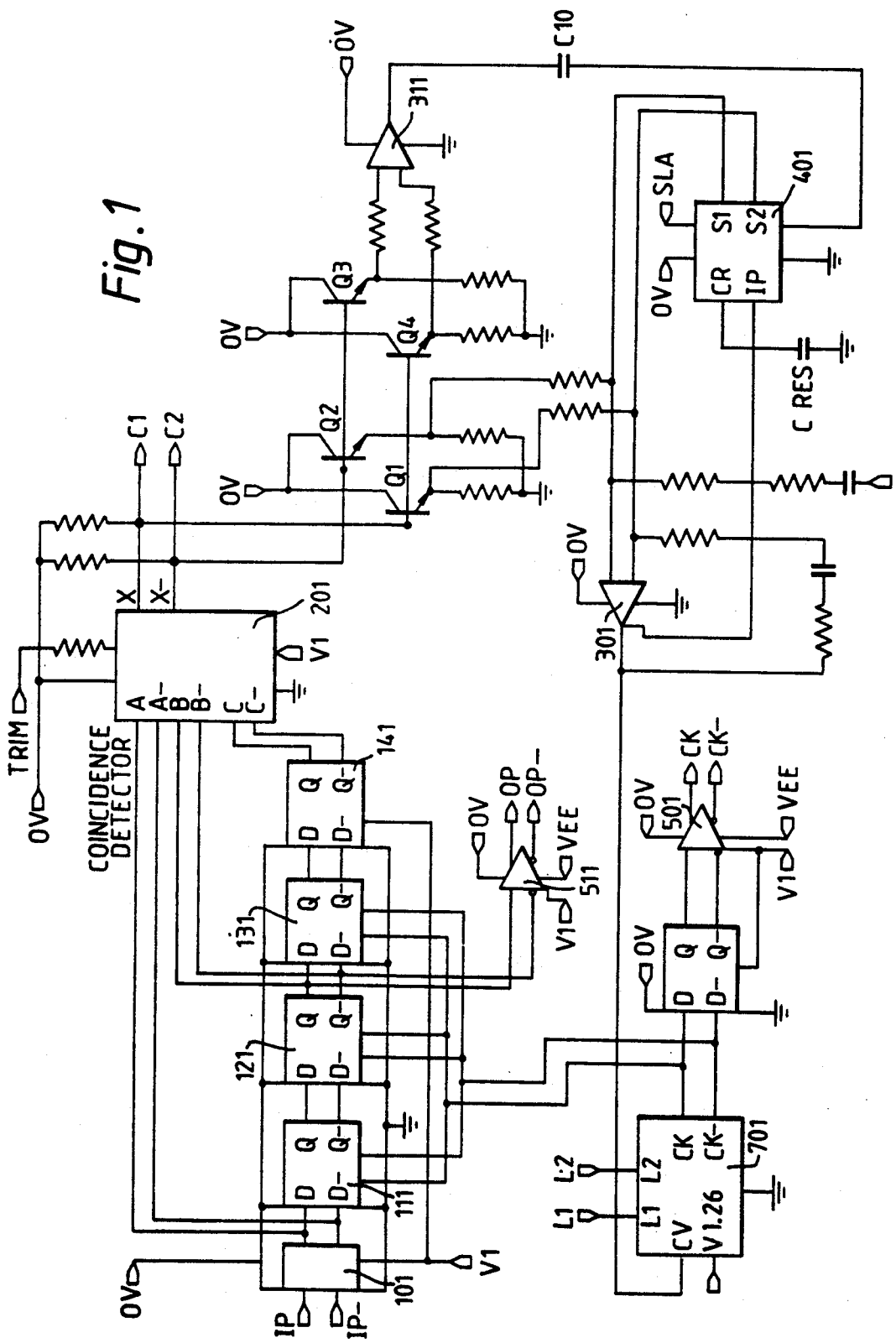
FIG. 1 is a general schematic circuit diagram of a digital data signal retiming and clock extraction apparatus.

In the arrangement shown in FIG. 1 generally, a balanced digital data signal IP, IP- is fed via an input buffer 101 to a set of three data latches 111, 121 and 131 connected in cascade. The output of latch 131 is fed via an output buffer 141 as one input to a 3-input coincidence detection circuit 201. The two other inputs to circuit 201 are the output of the input buffer 101 (i.e. effectively the input data signal) and the output of latch 121. The outputs of latch 121 and buffer 141 are effectively delayed and retimed versions of the signal input to latch 111. The coincidence detection circuit 210 is arranged to produce a balanced output signal X, X- in accordance with the general algorithm $$X = B \cdot (A - C)$$

where

A identifies the output of buffer 101,
B identifies the output of latch 121, and
C identifies the output of buffer 141.

The output of latch 121 also forms, via amplifier 511, the balanced digital data output OP, OP- of the retiming circuit for feeding to other equipment (not shown).

Figure 2A:
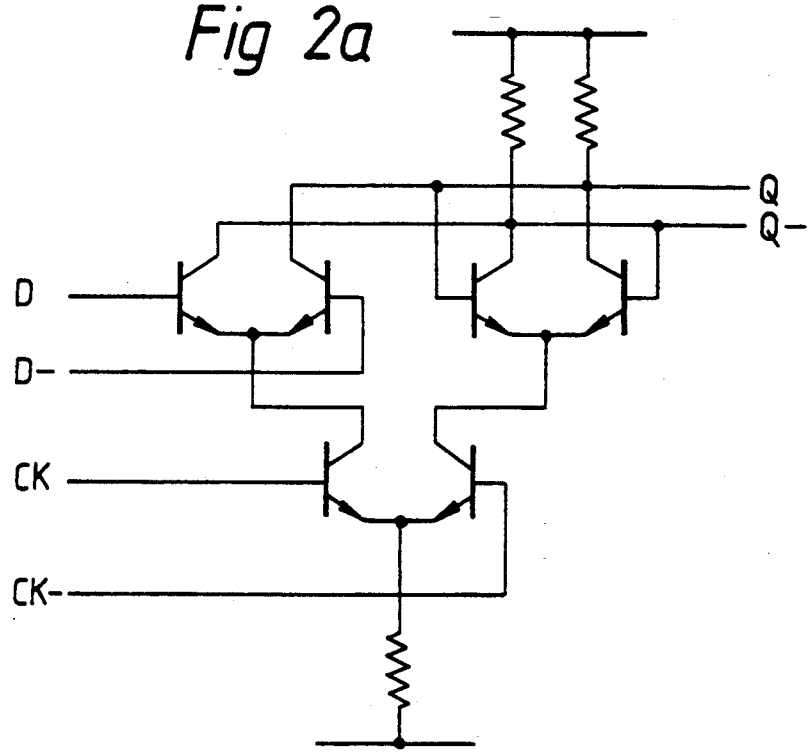
FIGS. 2a and 2b illustrate the construction of D-type flip-flop and a data latch respectively.
Figure 2B:
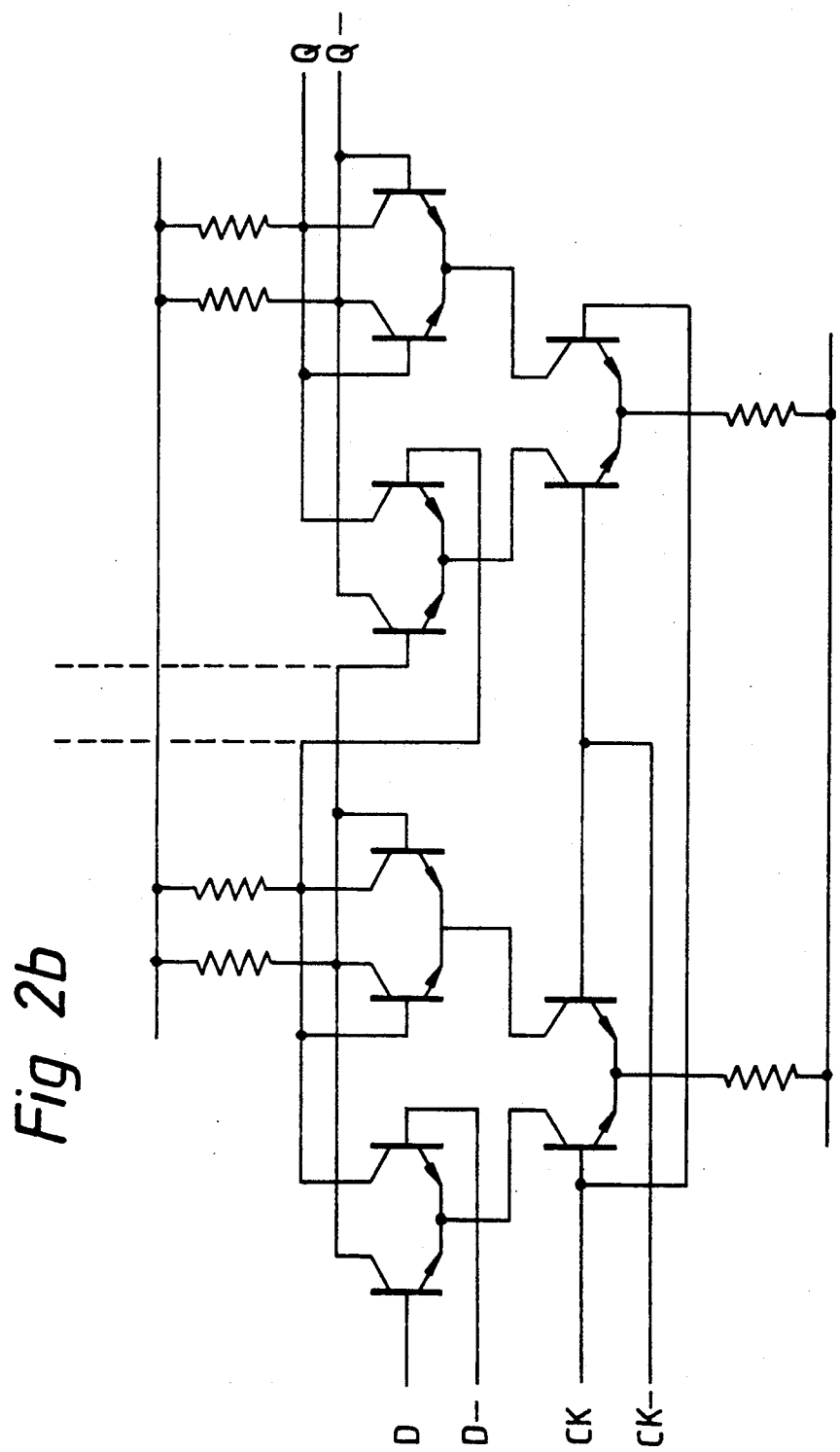

The data latches 111, 121 and 131 are each effectively defined as one half of a conventional D-type flip-flop, as will be seen from FIGS. 2a and 2b. The circuit of FIG. 2a functions as a data latch in as much as it is "transparent" to data on its input terminals D, D- when the clock is "true", i.e. when CK=1 and CK-0. The latch remains latched in its last data state when CK goes to 0 and CK- goes to 1. The conventional D-type flip-flop of FIG. 2b consists essentially of two latches in cascade which are clocked in opposite phase. The input data state at D, D- is transferred to the output Q, Q- at the instant of CK going from 1 to 0, but it is never transparent. When two D-type flip-flops are cascaded the middle two latches, i.e. the second latch of the first flip-flop and the first latch of the second flip-flop, are clocked in phase, so that they are both transparent at the same time. Therefore the first latch of the second flip-flop becomes redundant, effecting a significant saving of circuitry when implemented as an integrated circuit. For the purposes of FIG. 1, therefore, the first half of the second flip-flop can be omitted. The result is as indicated with latches 111 and 131 being clocked in phase and latch 121 being clocked in 180° out of phase. Buffers 101 and 141 are not clocked logic circuits.

Figure 3:
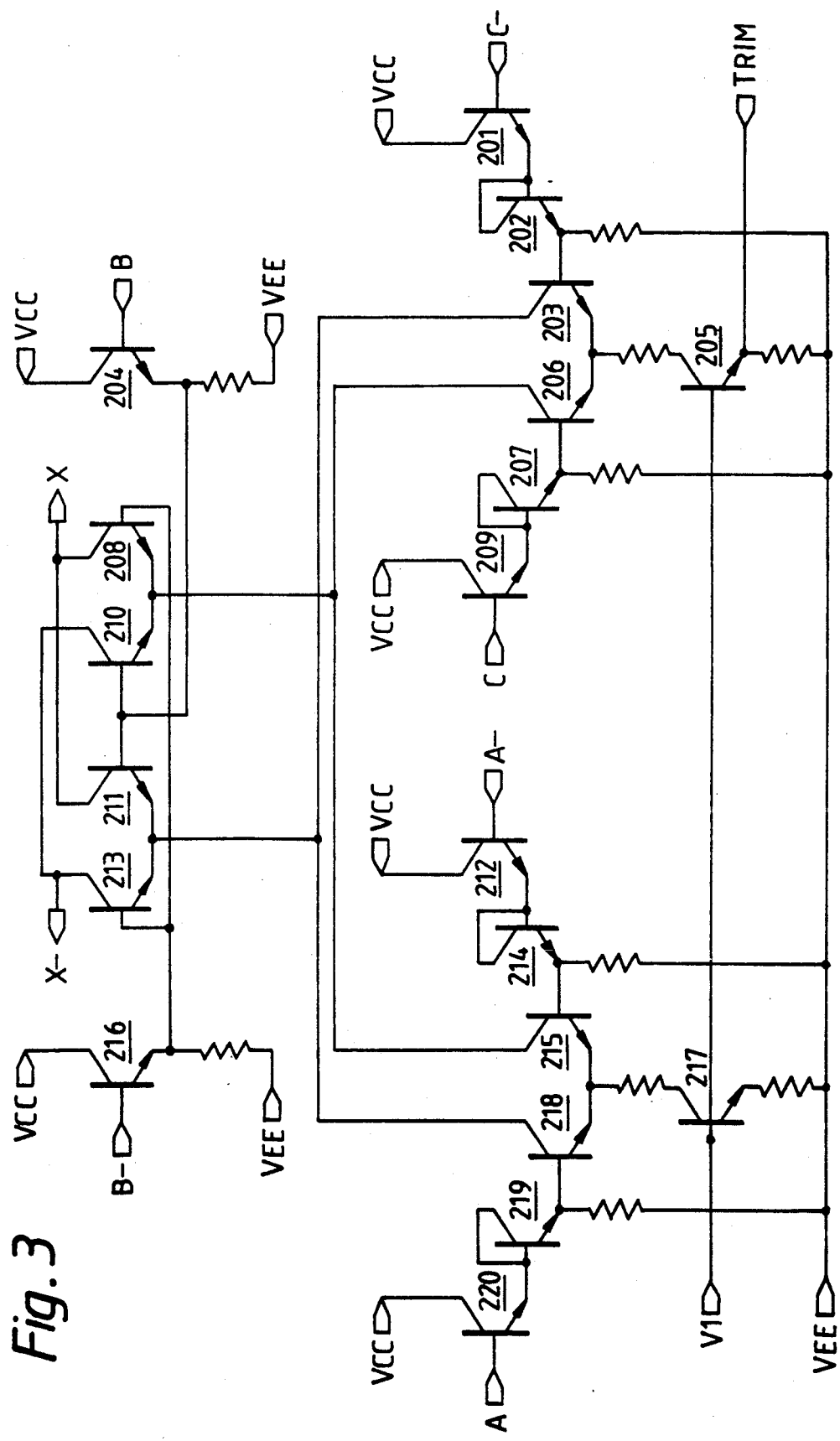
FIG. 3 is a schematic circuit diagram of the coincidence detection circuit of FIG. 1.

The operation of the coincidence detection circuit 201 is now described with reference to FIG. 3. Transistors 218 and 215 perform a differential function between the inputs A, A− and likewise transistors 206, 203 perform the same differential function between the inputs C, C−. The collectors of 206 and 215 are connected together, likewise the collectors of 203 and 218 so that the general function of (A−C) is performed. The resultant signals are then fed to transistor pairs 213, 211 and 210, 208 where they are multiplied with the B, B− inputs. The current flowing at the outputs X, X− will therefore equal B.(A−C). In practice the function of the coincidence detector is properly written I(X)=B.(A−t.c) where t is a factor dependent upon the voltage at the TRIM input to the emitter of transistor 205.

The outputs X,X− of coincidence detection circuit 201 form inputs to a first phase lock feedback loop. Clock extraction is achieved by the use of a damped second order phase locked loop. The local clock is generated by a push-pull voltage controlled oscillator (VCO) utilising an external coil or transmission line 701. Phase detection of the oscillator output with respect to the input data is provided by comparison of the time lag between data transitions and clock edges of a certain direction—effectively the transitions of signals A and B, and the time lag between signals B and C, always half a data bit period. The two outputs of the coincidence detector are differenced by differential amplifier 301 to provide an error voltage, with zero volts when the local clock negative transitions are synchronous with the incoming data edges. The loop filter comprises the high gain integrating amplifier 301 with the feedback components located off the integrated circuit chip.

In addition to the first feedback loop the outputs X,X− also form inputs to a second, additional frequency acquisition loop. When the loop is out of lock and data signals are present at the input the coincidence detector circuit produces a beat note which is amplified by amplifier 311. The amplified beat note drives a charge pump which provides a slewing current to the integrating amplifier 301, in the manner described below. The VCO thus hunts over the full range of available tuning voltage. The slewing current is proportional to the magnitude of the frequency error and hence reduces to zero as the first feedback loop phase locks.

Figure 4:
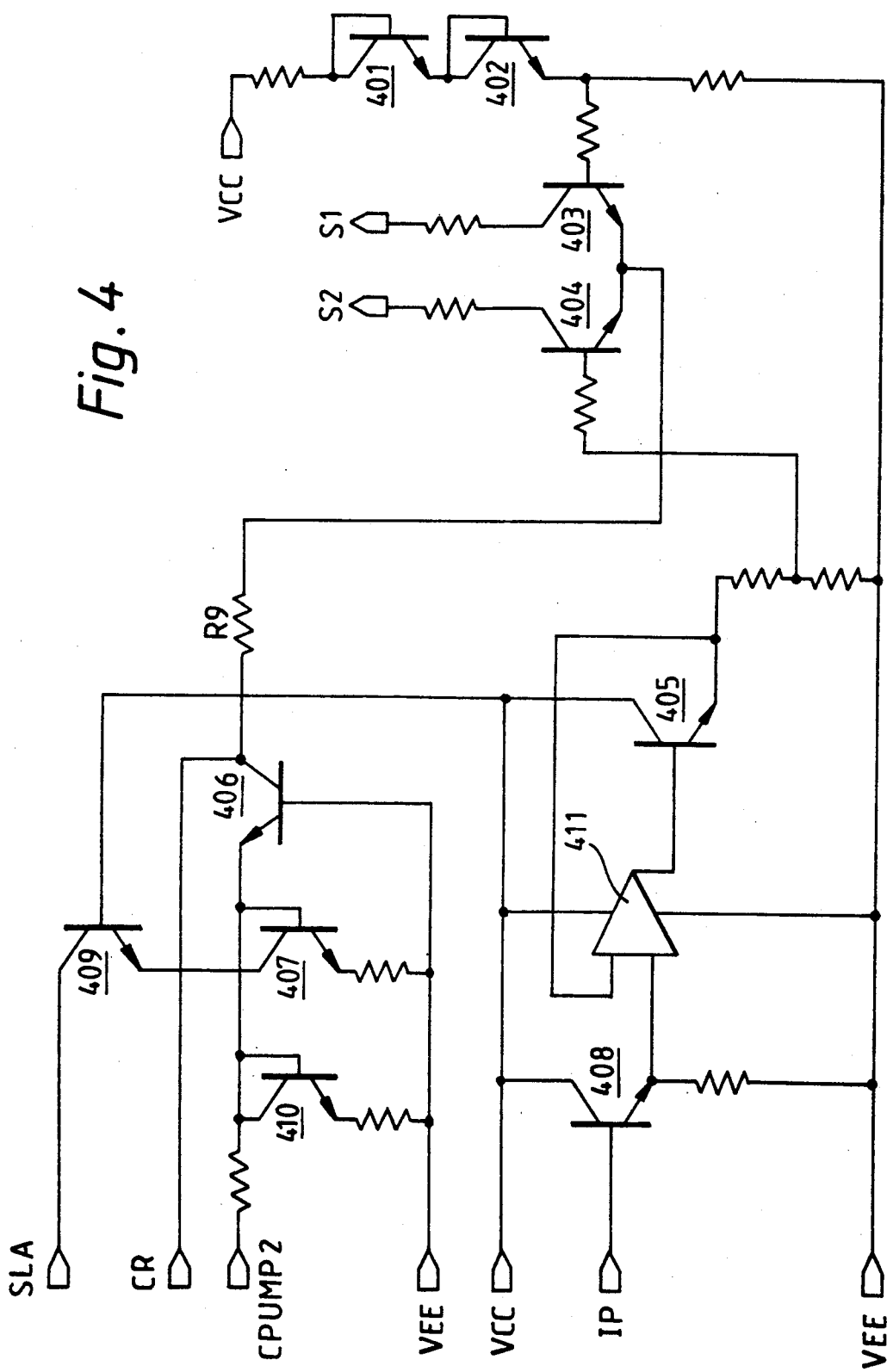
FIG. 4 is a schematic circuit diagram of part of a frequency acquisition locking loop shown in FIG. 1.

The second frequency acquisition feedback loop referred to above includes the lock circuit 401 which is detailed in FIG. 4. The outputs X, X− are fed, via transistors Q4 and Q3 respectively to operational amplifier 311, the output of which will have a polarity dependent on the relative values of X and X−. When the output of amplifier 311 goes positive charge flows from capacitor C10 through the input referenced CPUMP2 and via transistor 410 to the terminal VEE. When the output of amplifier 311 goes negative charge is drawn through capacitor C10 via the emitter of transistor 406 from a reservoir capacitor CRES in FIG. 1, which is connected by terminal CR in FIG. 4. The voltage on the collector of transistor 406 will be applied to the emitters of transistors 403, 404. The current flowing in resistor R9 between the collector of transistor 406 and the emitters of transistors 403, 404 will be directly proportional to the frequency at which amounts of charge are drawn from capacitor C10. The currents flowing in transistors 403, 404 are applied, via terminals S1, S2, to the inputs of differential amplifier 301, FIG. 1. The resultant output of amplifier 301 is fed back via terminal IP of FIG. 4 and is compared with the output of amplifier 411. When the output of amplifier 301 has ramped to one extreme of its range amplifier 411 experiences a condition where the relative values of the two inputs reverse and the output of amplifier 411 swings sharply to the other extreme of its range. This causes the signal at the base of transistor 404, applied via transistor 405, to change relative to the reference signal at the base of transistor 403. The resultant signal applied via resistor R9 to the collector of transistor 406 and the reservoir capacitor CRES is a sawtooth waveform. If there were a constant frequency applied to the capacitor C10 a sawtooth waveform would be generated at the output of amplifier 301. This sawtooth waveform at CV is a control voltage for varicap diodes in the voltage controlled oscillator 701, FIG. 1, which provides the local clock CK, CK−. As synchronisation of the circuit with the input data IP, IP− is gained, the rate of exchange of voltage with time at CV is reduced until it reaches zero, at which time full synchronisation has been achieved. Transistors 407 and 409, FIG. 4, provide a signal for a synchronisation loss alarm at terminal SLA.

We claim:

1. A digital signal data retiming and clock extraction apparatus including a series of three data latches, as hereinbefore defined, connected in cascade, means for applying digital data signals to the first latch, means for clocking the first and third latches in phase with a locally generated clocking means, means for clocking the second latch in 180° out of phase with the locally generated clocking means, coincidence detection means to which are applied the digital data signals (A) input to the first latch, the data signals output (B) of the second latch and the data signals output (C) of the third latch, the coincidence detection means being arranged to derive output data signals (X) in accordance with the algorithm X=BX(A−C), and a first phase lock loop feedback means whereby the output data signals (X) of the coincidence detection circuit controls the timing of the clocking means to maintain the phase relationship with the digital data signals input to the first latch.

2. An apparatus according to claim 1 wherein the data signals are balanced digital data signals and the outputs of the latches and the coincidence detection means are balanced outputs.

3. An apparatus according to claim 2 wherein the means for clocking the latches comprise a voltage controlled oscillator (VCO) and the first phase lock loop feedback means includes means for deriving from the output signals (X) of the coincidence detection circuit an error signal voltage which is applied to a control input of the VCO to control the frequency of the VCO to maintain the VCO output in correct phase relationship with the digital data signals (A) input to the first latch.

4. An apparatus according to claim 3 including a second feedback loop means comprising means for detecting any out of phase imbalance between the output signals of the coincidence detection means to produce a beat note signal, charge pump means to which is applied the beat note signal to form a slewing current, integration means to which the slewing current is applied, means for reversing the sign of the slewing current when the slewing current integral value approaches either one of two predetermined values and means for adding the slewing current to the first feedback loop means.

* * * * *